United States Patent
Nelson

[11] 3,888,682
[45] June 10, 1975

[54] ALGICIDAL POST TREATED ROOFING GRANULES

[75] Inventor: Arnold S. Nelson, Hagerstown, Md.

[73] Assignee: GAF Corporation, New York, N.Y.

[22] Filed: Oct. 25, 1972

[21] Appl. No.: 300,852

[52] U.S. Cl. .............................................. 106/15 AF
[51] Int. Cl. ................................................. C09k 3/00
[58] Field of Search ............ 117/87, 88, 100 D, 27, 117/70 S, 32, 140 A; 106/15 AF

[56] References Cited
UNITED STATES PATENTS

| | | | |
|---|---|---|---|
| 1,970,471 | 8/1934 | Nichols .................................. | 117/27 |
| 2,003,849 | 6/1935 | Alton .......................... | 117/100 D X |
| 2,078,359 | 4/1937 | Young ........................ | 117/100 D X |
| 2,362,489 | 11/1944 | Jewett............................ | 117/100 D |
| 2,614,051 | 10/1952 | Buzzell et al. .......................... | 117/27 |
| 3,208,871 | 9/1965 | Langseth et al. ....................... | 117/27 |
| 3,255,031 | 6/1966 | Lodge et al............................ | 117/27 |
| 3,476,577 | 11/1969 | Davie................................. | 106/15 AF |
| 3,494,727 | 2/1970 | Rapaport ...................... | 106/15 AF |
| 3,507,676 | 4/1970 | McMahon.......................... | 117/25 X |
| 3,528,842 | 9/1970 | Skadulis....................... | 117/100 S X |
| 3,598,627 | 8/1971 | Klimboff........................ | 106/15 AF |

FOREIGN PATENTS OR APPLICATIONS

| | | | |
|---|---|---|---|
| 491,238 | 2/1947 | Canada........................... | 106/15 AF |

*Primary Examiner*—William D. Martin
*Assistant Examiner*—Dennis C. Konopacki
*Attorney, Agent, or Firm*—Walter C. Kehm; Joshua J. Ward

[57] ABSTRACT

Algicidal properties are imparted to conventional color coated roofing granules by incorporating metallic algicides with a heavy processing oil in the post-treatment of such color coated roofing granules. The metallic algicides employed have a particle size not exceeding about 100 mesh. A variety of metallic algicidal compounds can be employed, with copper algicides being particularly advantageous. The processing oil, having a viscosity of about 525–950 SUS measured at 100 °F and present in an amount generally of about ¼ to about 1¼ gallons per ton of base granules, forms a thin film on the surface of the coated granules, with a portion of said oil generally being absorbed into the color coating and possibly into the base granules themselves. The metallic algicides adhere to the surface of the granules color coating, with the finer particles thereof being adsorbed into the color coat with the processing oil. The heavy oil enhances the adherence of the algicides to the granule surface. By employing a mixture of copper and zinc algicides, a bimetallic toxic effect particularly effective in retarding the growth of algae and/or fungi is achieved.

30 Claims, No Drawings

ALGICIDAL POST TREATED ROOFING GRANULES

BACKGROUND OF THE INVENTION

1. Field of the Invention

This invention relates to roofing granules having algicidal properties. More particularly, it relates to a simplified method for producing novel color coated roofing granules possessing algicidal properties for effectively retarding the biological growth of algae and/or fungi on roofing surfaces.

2. Description of the Prior Art

Roofing granules, both natural and artificially color-coated granules, are extensively used in roll roofing and asphalt shingle compositions. The roofing granules are generally embedded in the asphalt coating on the surface of an asphalt-impregnated felt base material, the granules thus forming a coating that provides an adherent, weather-resistant exterior roofing surface. As this outer granule coating also provides the esthetic effect observable with respect to the roofing composition, the appearance of the granules is of major marketing interest. For this reason, therefore, a pigmented color coat is ordinarily applied to the base mineral granules to enhance their visual, decorative effect.

As white or light-colored roofs are particularly favored in warmer climates, $TiO_2$ pigment is commonly used in the production of light color-coated roofing granules. In such warmer climates, as in the southern part of the United States, discoloration of asphalt roofing compositions by the growth of algae and/or fungi is of particular concern. Such discoloration, of course, is particularly noticeable on the white or light-colored roofs otherwise so desired and popular in such regions. Upon discoloration, the roof becomes unsightly in appearance and is found to cause a greater heat absorbence as, for example, when a white roof is turned dark brown or black in a period of a few years in use.

Nor in this problem, so widespread in areas such as the southern United States, particularly the gulf state area, confined necessarily to such regions. Thus, discoloration of roofing surfaces by the growth of algae and/or fungi has also been found in the northern part of the United States, particularly so in areas along rivers and lakes and along the northern coastal regions. While home owners and others have been aware of this discoloration problem for many years, effective solutions thereto have not been forthcoming at a reasonable cost. The problem of roofing granule discoloration, therefore, has remained a major marketing problem for the roofing industry.

For many years, this problems of roofing granule discoloration was believed to be caused only by fungi, as is the case with respect to some outdoor paint surfaces. Many different types of fungi have, in fact, been isolated from discolored roofing surfaces. More recently, however, it has been learned that other organisms contribute to this discolorations and have been identified as terrestrial blue-green algae of the Cyanophyta division. Such algae are transferred through the air as spores and/or vegetative matter and deposited on roofing surfaces where they thrive and grow. Natural pigments produced by the algae add to the dark discoloration of the roof, which is generally first noticeable in spots that develop into dark vertical streaks that gradually darken until the entire roof becomes a totally discolored black within 5 to 15 years. Predominant algae thus identified from infested roofing shingles include *Gloeocapsa magma*, *Tolypothrix byssoidea*, *Nostoc sp.* and *Scytonema sp.* In general, metallic algicides that are effective in retarding the biological growth of such algae are sometimes effective in similarly retarding the growth of fungi. The incorporation of a metallic algicide in the color coat of roofing granules, therefore, has heretofore been proposed in order to inhibit or prevent the discoloration of roofing surfaces containing such granules as a result of algae and/or fungi growth.

The incorporation of a metallic copper algicide in the color coat of roofing granules are disclosed in the Skadulis patent, U.S. Pat. No. 3,528,842. Skadulis particularly by proposes the incorporation of copper algicides that are substantially water-insoluble but that have limited solubility in acidic solutions, e.g., $Cu_2O$. Highly water-soluble copper algicides, such as $CuSO_4$, were indicated as being ineffective for this application since it was suggested that such algicides would be leached out of the color coat very rapidly, i.e., within a few months, so that the resistance to algae growth and roofing discoloration would not be effective over any reasonable length of time. Skadulis also indicated that virtually water-insoluble compounds, such as $CuO$, would not be effective because, it was suggested, of insufficient solubility thereof in rainwater and dew (Column 2, lines 24–44). Similarly, slightly soluble zinc algicides were disclosed for incorporation in the color coat of roofing granules in the McMahon patent, U.S. Pat. No. 3,507,676. As was pointed out in the McMahon patent in Column 2, lines 58–65, such zinc algicides are effective when employed in an amount constituting at least about 1 percent by weight of the base mineral granules, i.e., about 20 lbs. of the zinc algicide compound or metal per ton of granules.

The incorporation of particular copper or zinc algicides in the color coat of roofing granules, in the manner and in the quantities taught by the Skadulis and McMahon patents, imparts a desirable resistance of roofing surfaces containing such granules to discoloration upon exposure to atmospheric weathering. The teachings of these patents, however, have not led to the development, commercial availability and use of algicidal roofing granules providing the desired degree of algae and/or fungi resistance over an extended period of time at economically competitive cost. In part, of course, this unavailability of a totally satisfactory algicidal roofing granule reflects the continual desire in the roofing industry for a more effective algicidal effect from a roofing granule of ever diminishing incremental cost to achieve such an algicidal effect. Any incorporation of metallic algicides in an otherwise conventional roofing granule coating in order to achieve the necessary or desirable algicidal effect necessarily adds an incremental cost to the roofing granule and to the roofing material incorporating such an algicidal granule. While the desired toxic effect is a necessary or highly desirable feature of the algicidal roofing granule, the providing of this property or function is an expense item that, from a marketing viewpoint, must be minimized to the fullest possible extent. The use of minimum quantities of metallic algicides to produce a desired level of effectiveness over an extended period of time is, therefore, highly desirable. While the prior techniques have imparted an algicidal effect to roofing granules, an enhanced effect would provide further assurance of the desired toxic effect, thereby enhancing the quality of such granules. In this regard, it should be noted that the algicidal granules of McMahon require the incorporation of a relatively large amount of zinc for effective algicidal action as noted above. As the amount of metallic algicide required for effective action increases, the cost of the resulting algicidal granule is directly increased thereby. In addition, the use of relatively large amounts of metallic algicides frequently requires the incorporation of pigment in the granule coating in amounts in excess of that otherwise required to achieve a desired roofing granule color. As the amount of $Cu_2O$ employed is increased, for example, the amount of $TiO_2$ pigment that must be employed in the granule coating composition to produce a white roofing granule is also generally increased. Such an additional requirement necessarily adds to the overall cost of the algicidal roofing granule product and of roofing materials made therefrom.

The requirements flowing from the assumptions and teachings of the prior art tend to limit or restrict the metallic algicidal materials to be employed in a manner not necessarily consistent with the economic availability and feasibility of such materials in any particular application. Optimum flexibility as to the metallic algicides employed is, in other words, another desirable aspect for the providing of an economically attractive algicidal roofing granule to the roofing industry. One further troublesome aspect of previous efforts to impart algicidal properties to roofing granules has been the practical necessity for producing such algicidal roofing granules as a separate production operation apart from the production of conventional, non-algicidal, color-coated roofing granules because of the variation in the color coating formulation necessarily required to incorporate the algicidal compound into the color coating. As the vast preponderance of roofing granules presently manufactured are of conventional, non-algicidal character, the interruption of such conventional roofing granule production and the scheduling and inventory problems associated therewith all tend to create a further economic disadvantage associated with the production and marketing of algicidal roofing granules. As hereinabove indicated, the commerical acceptance and use of algicidal roofing granules depend upon the providing of an economically acceptable balance between algicidal effectiveness and the incremental cost required to achieve such algicidal properties as compared with the cost of conventional roofing granules, all taken in light of the degree of algicidal effectiveness achieved. In light of these factors, the requirements for the production of algicidal roofing granules in accordance with the teachings of the prior art constitute a further detrimental element serving to diminish the prospects for employing algicidal roofing granules despite the genuine need for algicidal control and an improved resistance of roofing surfaces to discoloration during extended periods of exposure to atmospheric weathering.

It is an object of the present invention, therefore, to provide improved algicidal roofing granules.

It is another object of the invention to provide an improved process for the production of such algicidal roofing granules.

It is another object of the invention to provide algicidal roofing granules having effective algicidal properties of economically acceptable levels of metallic algicide content.

It is another object of the invention to provide a process for the production of roofing granules having enhanced flexibility and compatibility with respect to the conventional production of color coated roofing granules.

It is another object of the invention to provide algicidal roofing granules having enhanced weathering characteristics.

It is a further object of the invention to provide roofing surfaces having an enhanced resistance to discoloration during extended periods of exposure to atmospheric weathering.

With these and other objects in mind, the present invention is hereinafter set forth in detail, the novel features thereof being particularly pointed out in the appended claims.

SUMMARY OF THE INVENTION

Color coated roofing granules capable of inhibiting or preventing the growth of discoloring algae and/or fungi organisms upon exposure of roofing surfaces containing such granules to atmospheric weathering have a conventional color coating on the base mineral granules, with a heavy processing oil forming a thin film on the surface of the coated granules and metallic algicides in the oil film and adhering to the surface of the granule coating by electrostatic and/or mechanical adhesive forces. The metallic algicides are applied to conventionally color coated granules by incorporation with the heavy processing oil that is mixed with the color coated granules in an otherwise conventional post-treatment operation. The metallic algicides will have a particle size not exceeding about 100 mesh, with the particle size thereof being preferably less than about 200 mesh, or preferably with the major proportion of substantially all of the metallic algicides having a particle size of less than 325 mesh. A portion of the processing oil applied to the color coated granules may be absorbed into the color coating and into the base mineral granules themselves. The finer sized particles of metallic algicides employed may also be absorbed into the granule color coating.

Upon incorporation of the algicidal roofing granules of the present invention into asphaltic roofing compositions and exposure to atmospheric weathering, the heavy processing oil will gradually weather away and decompose. The metallic algicides, however, are found to be retained on the surface of the roofing granules and are not dislodged or loosened therefrom as the processing oil weathers away. During periods of rain and dew, the metallic algicides are ionized to form metallic algicidal ions. These metallic algicidal ions are slowly released from the surface of the roofing granules and are leached over the roofing surface, providing a toxic effect that retards or prohibits the biological growth of algae and/or fungi. This slow release of algicidal ions is found to operate over extended periods of time, even upon exposure under severe conditions of atmospheric weathering, thus enhancing the resistance of the roofing surfaces containing such granules to algae and/or fungi over the reasonable life of the roofing surface.

The production of the roofing granules of the invention does not necessitate any disruption of conventional production of color coated roofing granules. The heavy oil and metallic algicides can readily be employed in place of the ordinary processing oil used in conventional post treatment operations, thereby minimizing the processing operations, scheduling problems and handling costs heretofore associated with the production of algicidal roofing granules. Highly desirable production flexibility is thus achieved. In addition, a wide variety of metallic algicidal compounds can be employed, including convenient copper algicidal compounds not heretofore deemed acceptable for application in algicidal roofing granules. By the incorporation of both copper and zinc algicidal compounds in economically suitable amounts, a bimetallic toxic effect can be achieved so as to enhance the retarding or preventing of the biological growth of algae and/or fungi, thus enhancing the resistance of roofing surfaces to algae and/or fungi discoloration during extended periods of exposure to atmospheric weathering. The present invention, therefore, provides a highly commercially desirable algicidal roofing granule, combining effective inhibition of the biological growth of algae and/or fungi with minimum incremental cost and processing requirements to achieve the desired algicidal properties.

DETAILED DESCRIPTION OF THE INVENTION

In the practice of the present invention, highly desirable algicidal properties are imparted to color coated roofing granules in a convenient, economical and highly effective manner. Roofing surfaces containing the novel algicidal granules of the invention release algicidal ions slowly over an extended period of time during periods of rain upon exposure to atmospheric weathering. The roofing surface is thereby rendered resistant to unsightly discoloration due to infestation and growth of algae and/or fungi. This highly desirable feature is accomplished at economically acceptable algicidal content levels and overall roofing granule cost, with minimum departure from conventional roofing granule production operations. The algicidal properties of the roofing granules of the invention are effective over extended periods of time and are particularly suitable in humid environments normally conducive to the growth of algae and/or fungi. Highly desirable flexibility as to the particular algicidal compounds employed also pertains. The toxic effect of the slow release of algicidal ions from the roofing granules of the invention is enhanced by employing both copper and zinc algicidal compounds in the preparation of the subject roofing granules. Upon exposure of roofing surfaces containing such a combination of algicidal compounds to rain and dew, both copper and zinc ions are thereupon slowly leached from the surface of the roofing granules and produces a bi-metallic toxic effect that is particularly effective in inhibiting or retarding the biological growth of algae and/or fungi.

The algicidal roofing granules of the present invention are prepared by the post-treatment of conventional color coated roofing granules. As with conventional roofing granules, therefore, any suitable base raw mineral granules, such as greenstone or netheline syenite may be used. In conventional production of artificially colored roofing granules, an alkali metal silicate-clay coating is applied to the base mineral granules and fired to produce a moisture permeable, substantially water insoluble, durable, pigmented coating on the base mineral granules. Two general methods are commonly employed for color coating such base mineral granules, both of which can be employed in the practice of the present invention. In one such method, referred to as the continuous paint slurry process, crushed and screen graded mineral granules are constantly mixed with a paint slurry containing pigments, clay and sodium silicate in suitable mixing equipment. The thus color-coated granules are then heated to a temperature that may range from about 600° to about 1,200°F, in a rotary-type kiln. Dehydration of the silicate occurs, and an extremely hard color-coated granule is obtained. In the event that the granules are fired at lower temperature, e.g., about 500°F, the silicate-clay coating may require treatment by the addition of a pickling agent, such as $AlCl_3$ solution, in order to properly insolubilize the coating. Upon cooling, the color coated granules are generally post-treated with processing oil and/or coating compositions as is known in the art.

In another batch-type process, essentially the same coating, firing and post-treatment operations are performed except that a weighed amount of crushed and screen graded base mineral granules is mixed with a weighed amount of pigments and clay, and the silicate is added to this premix in a suitable mixer, commonly a tumbling barrel-type mixer. The firing and post treatment of the color coated granules are as referred to above with respect to the continuous process. It is, of course, within the scope of the present invention to provide the color coating on the base mineral granules by any desirable modification of these techniques, or by any other conventional color-coating operation. It will also be understood that the present invention for imparting algicidal properties to conventional color coated roofing granules during the post-treated thereof can be employed regardless of the number of such color coatings applied to the base mineral granules.

Following the post-treatment operation in which algicidal properties are imparted to the roofing granules as herein provided, the resulting novel algicidal roofing granules are incorporated in otherwise conventional asphaltic roofing compositions, such as roofing shingles, rolled roofing, and the like. Such roofing compositions typically have an organic asphalt-saturated felt base that is coated with an asphalt of a higher softening point and surfaced with color coated roofing granules, such as conventional non-algicidal roofing granules or, in the practice of the present invention, the novel algicidal roofing granules herein provided. The felt layer is customarily composed of wood fibers, either alone or in combination with paper pulp, repulped paper and/or rags, asbestos fibers, or the like. Such felts are generally referred to in the industry as roofing felts. The saturants most commonly employed to saturate the felt layer include residual oil, soft residual asphalt and soft blown petroleum asphalt, and mixtures thereof. Preferred saturants generally have a ring and ball softening point of approximately 120° to 130°F and a penetration of approximately 60 at 77°F.

This saturated felt layer is then coated with an asphalt of a higher softening point and lower penetration than that of the saturant. Preferred materials will generally have a ring and ball softening point of approximately 175° to 260°F and a penetration of approximately 10 to 50 at 77°F. Coating asphalts of this type include native and sludge asphalts, fatty acid pitches and the like. In accordance with customary practices in the art, this asphalt coating coating layer is frequently embedded with powdered or fibrous fillers of inorganic or organic origin, such as powdered silica (sand), limestone, slate dust, clay, etc., and mixtures thereof. Upon application of the asphalt coating to the saturated felt layer, the color coated roofing granules post treated in accordance with the present invention to impart algicidal properties thereto are applied to the asphalt layer surface, and the resulting roofing surface is then passed through suitable rollers and presses, quenched and otherwise treated and handled in accordance with conventional practice in the roofing industry. It will be appreciated that numerous variations in the production of the desired roofing compositions and in the additive materials employed are well known in the art and can be employed within the scope of the present invention.

In the conventional production of non-algicidal roofing granules, the coated and fired granules having a hard, durable, tight, weather resistant, water insolubilized color coating are post treated by mixing with a suitable treatment oil, commonly a conventional processing oil alone or in combination with other conventional coating compositions, such as a silicone coater. This post treatment with conventional processing oil provides useful properties that facilitate the storage, handling and use of the roofing granules and their subsequent effectiveness in asphaltic roofing compositions. Thus, post treating the roofing granules serves to lubricate the granules, improving their flow characteristics and handling properties during passage from the production area into transport cars, from such cars into storage bin, and the like. The lubrication of the roofing granules also minimizes undesired attrition of the color coating during transport and other handling, thereby likewise minimizing the formation of undesired dust during such transport, storage and handling. Post treatment of the color coated roofing granules with processing oil also has been found to promote the desired adhesion of the roofing granules to the roofing felt by providing a better bonding between the asphaltic coating thereof and the roofing granules. In addition, the processing oil also tends to retard any tendency of the color coating to blister, such blistering being undesired as it reduces the weather resistant characteristics of the granules during extended exposure of the granules to atmospheric weathering when employed in such roofing compositions.

The advantages achieved by the post treatment of roofing granules with conventional processing oils and/or coating compositions are likewise achieved by the post treatment of roofing granules in accordance with the present invention. The mixing of metallic algicidal compounds with the roofing granules and post treatment heavy processing oil, and the resultant enhanced adherence of such metallic algicidal compounds to the surface of the roofing granules, as herein provided, imparts highly desirable algicidal properties to the roofing granules without, any way, diminishing the benefits otherwise achieved in conventional post treatment of roofing granules. The processing oil employed in the post-treatment operation of the present invention is a heavy processing oil having a viscosity within the range of from about 525 to about 950 SUS, measured at 100°F. Such oils are not normally employed in conventional post-treatment operations wherein processing oils having a viscosity generally within the range of about 100 to about 500 SUS, measured at 100°F, are typically employed. The heavy oils used in the practice of the present invention, commonly dark, grease-like materials, have heretofore been deemed unsuited for use in the post treatment of color coated roofing granules. As the heavy oils specified above are commonly dark in appearance, such oils would ordinarily be deemed inappropriate for application to color coated roofing granules as likely tending to mask or adversely effect the desired color of the granule color coating. For this reason, the conventional post treatment processing of color coated roofing granules is carried out with the lighter processing oils refined to above, i.e., having a viscosity of from about 100 to about 500 SUS, measured at 100°F. In addition, the dark heavier oils herein specified are generally more tacky than the conventional post treatment processing oils. The use of such heavier oils in conventional post treatment operations, therefore, would ordinarily be deemed undesirable as rendering the roofing granules more susceptible to soiling with soot and other such particles present in the air. Discoloration of the granules by the picking up of soot, for example, might be as disadvantageous as the discoloration resulting from the growth of algae and/or fungi that algicidal granules are intended to overcome. For all of these reasons, the heavier oils herein specified are not employed, and have not been considered as generally suitable, in the conventional post treatment of color coated roofing granules, including those in which algicidal materials are included in said granule color coating, much less in the novel algicidal post treatment operations of the invention.

In the present invention, however, it has been found highly advantageous to employ such heavy processing oils as a carrier for algicidal materials in the post treatment of color coated roofing granules. Even with the darkest, grease-like oils, it has been found that the heavy oil forms a thin film that is light and transparent, not adversely effecting the desired color of the treated granules. In the algicidal post-treatment operation of the present invention, the heavy oil has been found to significantly enhance the adhesion of the algicidal materials to the surface of the roofing granules being treated. While algicidal materials can be mixed with a lighter, conventional processing oil for application therewith to roofing granules and satisfactory adherence thereto after said oil has weathered away, therefrom, any wash-off or fall-off of algicidal particles from the granule surfaces is, of course, undesired as resulting in a reduction in the available algicidal material from which toxic algicidal ions can be slowly released during periods of rain and dew upon atmospheric exposure over extended periods of time. The use of the heavy oils herein specified, by enhancing the adhesion of the algicidal particles to the surface of the granules, minimizes any tendency for loss of algicidal materials from the roofing granules due to wash-off or fall-off of particles as a result of atmospheric weathering or any other cause. It will also be appreciated that the weathering away of the heavy oil, upon atmospheric exposure of the post treated granules in use, proceeds at a slower rate, over a period of time ranging from about 3 to 6 months or more up to several years, enhancing the benefits achieved in use by the employment of post treated granules. The possibility of roofing discoloration due to soot pick up and the like, on the other hand, has not presented the problem heretofore contemplated in the use of roofing granules post treated with algicidal materials and heavy oil in accordance with the teachings of the present invention. It should also be noted that the enhanced adherence of the algicidal material to the roofing granules provided in the practice of the invention continues to pertain in the use of the subject granules even after the heavy oil has weathered away upon atmospheric exposure of the roofing surfaces containing such post treated granules.

It will be understood that the heavy processing oils employed in the present invention can be any suitable, commercially available petroleum oil of three general types, namely paraffin oils, (2) napthenic oils and (3) aromatic oils or mixtures thereof. Processing oils characterized by having a predominant number of paraffin chain carbons, i.e., 55% Cp or more, are generally considered as paraffin oils. Naphthenic oils are processing oils generally characterized by having a large number of naphthene ring carbons, i.e., 35 percent or more Cn. Aromatic oils, on the other hand, are generally processing oils having a large number of aromatic ring carbons, i.e., 35% Ca or more. Such heavy oils, for purposes of the present invention, will have a viscosity of from about 525 to about 950 SUS, measured at 100°F. Conventional post treatment processing oils employed in the post treatment of non-algicidal color coated granules are on the order of about 100 to about 500 SUS. The heavy oils employed in the present invention will preferably have a viscosity of from about 600 to about 800 SUS, with a viscosity of from about 700 to about 750 SUS being particularly preferred. Illustrative of the various commercially available, heavy processing oils suitable for use in the present invention is the Slate Treating Oil No. 2720 of The Humble Oil & Refining Co., having a viscosity of 744.8 SUS at 100°F, an Aniline Point of 162.9°F, with a Clay/Gel analysis by weight of 45.9 percent saturates, 48.4 percent aromatics, and 5.7 percent polar compounds and no asphaltenes.

The processing oils employed in the post-treatment operation of the present invention are generally employed in an amount within the range of from about ¼ to about 1¼ gallons per ton of base mineral granules employed. At lesser amounts, sufficient oil for proper coating of the granules may not be available, and as the amount of processing oil is increased beyond the upper level generally indicated, the additional oil is not required for effective results and a tendency for blistering the asphaltic coating of the roofing composition in which the granules are employed in introduced. In general, entirely satisfactory results can be obtained by employing the processing oil in an amount within the range of from about ½ to about ¾ gallon per ton of base mineral granules employed. It will be understood that other conventional coating compositions, such as a conventional silicone coater composition, can also be employed in the post-treatment operation of the present invention to enhance the adherence of the metallic algicides to the roofing granules and for such additional purposes that such known coating composition might optionally be employed in the conventional post treatment of non-algicidal roofing granules. Reactive silicone monomers such as methyltriethoxysilane or methyltrimethoxysilane, capable of polymerization upon contact with moisture, can be dissolved to a desired concentration, e.g., of about 10 to 100 percent by weight, in methanol, ethanol, trichloroethane or other suitable solvents. A silane composition of from about 10 to 100 percent by weight solution of methyltriethoxysilane containing about ⅔ monomer and ⅓ polymer by weight in the same solvent is another illustrative silicone coating composition that can be used with the processing oil in the practice of the present invention. Another suitable silicone monomer is methyltrichlorosilane applied either in its 100 percent concentrated form or in solution in toluene, benzene, ethyl acetate or any other suitable solvent at any appropriate concentration, e.g., about 10–30 percent by weight of solution. such silicone additives may be advantageously employed in amounts generally from about 1 to about 25 percent by weight based on the total weight of the processing oil composition employed in the post treatment operation of the invention. The post treatment oil containing such silicone or other conventional additives provides the benefits herein indicated for which granule post treatment is ordinarily employed, and acts as a carrier for the algicidal material incorporated in the post treatment operation in accordance with the teachings of the invention. When employed, the conventional silicone coater additive serves to enhance the adherence of the algicidal particles to the surface of the color coated granules.

The conventional processing oil, alone or with other desired components is mixed with natural or color-coated roofing granules in a suitable mixing device, e.g., a rotary mixer, for a sufficient period of time to assure adequate contact of the processing oil composition with the roofing granules being post treated. The amount of time required for this purpose will, of course, be determined by the operating parameters of any particular application, but in any event is accomplished in a rapid, expedient manner. In particular applications, for example, processing oil has been fed to a rotary mixer at the rate of about 20 lbs. per hour, with a 2 minute mixing time being sufficient for adequate coverage of the roofing granules mixed therewith in the proportions generally indicated above.

In the conventional post treatment of roofing granules and in the modified post treatment operation of the present invention, the processing oil forms a thin film on the surface of the color coated roofing granules. In addition, a portion of the processing oil is absorbed into the base mineral granules themselves. The processing oil forming the thin film on the surface of the granules and that absorbed into the color coating and possibly the base granules and the asphaltic base sheet eventually weather away and decompose upon exposure to atmospheric weathering over a period of time likely ranging from about ½ to about 2–3 years. This weathering and decomposition of the post treatment processing oil occurs with respect to the algicidal roofing granules of the present invention in the same manner as with respect to conventional roofing granules. It has been unexpectedly determined, however, that this weathering away of the post treatment processing oil does not result in any appreciable tendency of the algicidal compounds on the surface of the roofing granules to erode mechanically upon exposure to wind and rain as would heretofore be expected. To the contrary, the metallic algicidal materials of the present invention are found to adhere to the roofing granules in a manner not adversely effected by the weathering away of the processing oil with which it was originally mixed so as to continue serving as effective algicidal materials long after the processing oil has weathered away. It is this ability of the algicidal materials to effectively operate over extended periods of time upon atmospheric exposure, together with the enhanced adherence of algicidal materials to the roofing granules and minimal wash-off therefrom resulting from the use of heavy oils, that serves as the basis for the novel process of the present invention and the novel algicidal roofing granules obtained thereby.

In the production of the algicidal roofing granules of the present invention, the metallic algicidal materials employed are mixed with the color coated roofing granules and with the heavy processing oil composition in any convenient mixing device suitable in conventional post treatment operations. If desired, the metallic algicides can be premixed with the processing oil before mixing thereof with the coated roofing granules. It should also be noted that, in accordance with conventional practice, the processing oil can be heated in order to enhance the flow characteristics thereof, thus assuring adequate contact and coverage of the processing oil with the color coated granules upon mixing therewith in the granule post treatment operation. The processing oil is commonly heated to a temperature of from about 200° to about 250°F for this purpose.

The imparting of algicidal properties to roofing granules in accordance with the practice of the present invention can be seen to harmonize advantageously with the conventional production of artificially colored roofing granules and the conventional post-treatment thereof. No disruption of the color coating operations is required, and the simple addition of metallic algicidal materials in the granule-processing oil mixing action of the post treatment operation requires a minimal adjustment of ordinary, conventional operations. The present invention also permits, in a convenient manner, the production flexibility of producing either conventional color coated roofing granules or the algicidal roofing granules of the present invention as required to meet marketing requirements. The present invention also provides a high degree of flexibility with respect to the metallic algicidal material or materials employed to impart the desired algicidal properties to the roofing granules. The metallic algicidal compounds thus employed may be any of the available metallic materials generally known as possessing algicidal properties and that, when employed in the roofing granules of the present invention, release algicidal ions slowly during periods of rain and dew. The release of such algicidal ions and the leaching thereof over the roofing surface produces the desired effect of prohibiting or retarding the biological growth of algae and/or fungi on the roofing surface. It should be noted that known metallic algicidal materials that are either slightly soluble or very soluble in water can be employed, including such materials not heretofore deemed suitable for use in algicidal roofing granules as hereinabove noted. While metallic algicidal materials that are very soluble in water will generally be leached from the roofing granules of the invention at a more rapid rate than those having a more limited solubility in water, algicidal materials of both types can be employed in the present invention and will be found to provide the desired leaching of algicidally effective ions over extended periods of time upon atmospheric exposure when incorporated in roofing compositions. In this regard, it has been found that the fundamental and essential feature effecting the algicidal action achieved is the ionization of the metallic algicidal materials so as to release metallic algicidal ions for leaching over the roofing surface. A metallic algicidal compound having a limited solubility in water is found, upon exposure to moisture during periods of rain and dew, to become ionized and release metallic algicidal ions having a toxic effect on the biological growth of algae and/or fungi. Such algicidal materials are effective over very extended periods of time because of the slow rate at which metallic algicidal ions are released from the algicidal materials adhering to the surface of the roofing granules. When a more highly water soluble material is employed, it has been found that a somewhat more rapid rate of metallic algicidal ion leaching takes place, but not at such a rapid rate as to deplete the available supply of metallic ions over an unacceptably short duration of time. In this regard, one factor believed pertinent to the effectiveness of more highly water soluble algicidal materials over extended periods of time is the possible leaching of metallic ions from the surface of the granule color coating into the interstices of the coating itself during periods of heavy rain. During such periods of heavy rain, therefore, a wash-out effect leaching ions effectively over the surface of the roof for effective algicidal control is likely accompanied by a corresponding release and leaching of metallic algicidal ions into the color coating of the roofing granule itself. Thus, a reservoir supply of metallic algicidal ions is thus created in the granule color coating, effectively extending the period of time over which such algicidal ions are released and leached for effective algicidal control. Algicidal ions leached into the color coating will be released, of course, upon continued exposure to moisture passing into the moisture permeable color coating during periods of rain and dew during continued exposure to atmospheric weathering. As will be appreciated from the above, it is also desirable in the practice of the present invention to employ a combination of highly soluble algicidal materials and those of lesser water solubility so as to assure the desirable wash-out release of algicidal ions over the surface of the roof and the slow release of algicidal ions over extended periods of time during the effective algicidal life of the subject roofing granules.

The algicidal materials used herein slowly release toxic ions that inhibit or prevent unsightly discoloration of roofing surfaces due to biological growth. As indicated above, such discoloration is now believed to be caused principally by algae, although fungi spores are also found to exist on roofing surfaces susceptible to biological growth. As a result, some confusion or impression has persisted in general discussions of roofing discoloration, with such discoloration sometimes being casually referred to as fungi discoloration even though the biological growth of algae may actually be the major contributing factor therein. For this reason, therefore, the present invention is disclosed and claimed herein with respect to the inhibition or retardation of the biological growth of "algae and/or fungi." It will be understood that the slow release of toxic ions from the algicidal roofing granules of the invention is effective, in any event, in inhibiting or preventing the unsightly discoloration of roofing surfaces due to biological growth regardless of the general characterization of such undesired growth as algae growth or fungi growth in ordinary consideration of roofing performance with respect to resistance to discoloration due to biological growth. Suitable compounds having the desired algicidal properties will, in any event, sometimes be suitable also for fungi control purposes.

Among the suitable metallic algicidal materials that can be employed in the practice of the present invention are cadmium algicides, nickel algicides, silver algicides, copper algicides and zinc algicides. The most convenient and economically suitable metallic algicidal materials are the copper and zinc algicides generally known in the art. Nickel or silver containing compounds, such as the metal or oxide, are generally not particularly advantageous from an economic viewpoint. Cadmium-containing compounds, e.g., cadmium metal or oxide, are not generally desirable from a toxicity viewpoint. Among the wide range of known copper algicidal compounds that can be employed in the practice of the present invention are, on the one hand, copper sulfate, not heretofore deemed suitable for use in algicidal granules because of its relatively high water solubility, and, on the other hand, compounds such as CuO, not heretofore deemed suitable because of a relatively low water solubility. Copper compounds heretofore deemed suitable for use in algicidal granules because of a rather limited water solubility, particularly under the acidic conditions normally encountered in roofing applications, are also suitable copper algicidal compounds for use in the present invention. $Cu_2O$ and $Cu_2Br_2$ are illustrative examples of such copper algicidal compounds. As previously indicated, the solubility in water per se of such algicidal compounds under conditions unrelated to those encountered in the atmospheric weathering of roofing surfaces is not deemed of decisive importance in the practice of the present invention. The slow release of algicidal ions from the roofing granules and the resulting leaching thereof over the roofing surface under the conditions encountered during atmospheric weathering so as to produce the desired toxic effect in retarding the biological growth of algae and/or fungi is at the essence of the present invention. In that context, metallic algicidal compounds of copper and other metals, not heretofore deemed suitable for use in the preparation of algicidal roofing granules, may be employed in the practice of the present invention, enhancing the flexibility permissible in the practice of the present invention. Illustrative, however, of other copper materials that can be used within the scope of the present invention are copper chloride as well as copper metal powders.

The zinc algicide employed in the practice of the present invention will, of course, be any suitable zinc-containing material that effectively releases zinc ions upon atmospheric weathering under conditions of rain or dew so that such zinc ions are leached from the roofing granules for effective algicidal action over the entire roofing surface containing such granules. The most generally preferred zinc algicide from an overall commercial viewpoint is zinc oxide. Other zinc-containing materials, such as ZnS and metallic oxide pellets or particles, can also be employed in the practice of the present invention.

The simple, economical and effective algicidal action obtained in the highly flexible embodiments of the present invention are achieved by employing metallic algicidal materials in amounts generally known heretofore as being required for effective algicidal control purposes. As the algicides are in a generally more readily accessible form in the roofing granules of the present invention than when incorporated in the color coating, the algicidal content of the subject granules can be somewhat less than heretofore employed in conventional algicidal roofing granules. Thus, zinc algicides may be employed in amounts of from about 0.5 percent by weight up to the amount that can be loaded on the granules, preferably from about 0.75 to about 1 percent or more by weight based on the weight of base mineral granules employed. Copper algicides can be employed in amounts generally from about 0.1 to about 1 percent, preferably at least about 0.5 percent by weight based on the weight of base mineral granules. Cadmium, silver and nickel-containing compounds, such as the oxides thereof, are effective generally in amounts of from about 0.2 to about 1 percent preferably at least about 0.5 percent by weight based on the weight of base mineral granules. A further overall advantage may be obtained by incorporating both copper algicides and zinc algicides in the post treatment operation of the invention in relatively small amounts, ranging from about 0.05 to about 0.5 percent by weight based on the weight of base mineral granules. More particularly, the zinc and copper algicidal materials can be both generally employed to advance in amounts within the range of from about 0.1 to about 0.4 percent by weight base on the weight of base mineral granules. Zinc algicidal contents of from about 0.15% to about 0.25 percent by weight based on the weight of base granules have been found useful and particularly convenient in particular applications of the invention. A particularly convenient copper algicidal content in this embodiment of the invention is in the range of from about 0.25 to about 0.35 percent by weight of base granules. In this embodiment of the invention, the incorporation of a zinc algicide in amounts very appreciably below that required for effective algicidal action using zinc alone, when employed in combination with a relatively small copper algicidal content, produces a bimetallic toxic effect inhibiting or preventing the growth of algae and/or fungi. This toxic effect is significantly more effective than that achieved by employing the copper algicidal material alone in an amount equal to the total amount of zinc and copper algicidal materials employed in this embodiment of the invention.

The metallic algicidal materials employed in the practice of the present invention will have a particle size not exceeding about 100 mesh, with algicidal materials having a particle size of less than about 200 mesh. More preferably, the algicidal materials employed will be generally minus 325 mesh. It will be understood in the art that the algicidal materials employed will not ordinarily be of uniform particle size but will have a particle size range, the major proportion of the particles, however, being of a particle size smaller than about 325 mesh, i.e., being less than 325 mesh. Many convenient, commercially available metallic algicidal materials are generally available in the art with a particle size range substantially all of which is minus 325 mesh, e.g., at least about 99 percent minus 325 mesh. Cuprous oxide is a commercially available product having, for example, a maximum residue on a 325 mesh screen of 0.5 percent by weight. It is also within the scope of the present invention to employ metallic algicidal materials having a particle size, or more precisely a particle size range, including considerably finer material, generally with the particle size extending from about 44 microns down to about 20 microns.

Following the post treatment operation of the present invention in which color coated roofing granules, a processing oil composition, and metallic algicides are mixed, the metallic algicides are found to adhere to the surface of the granule coating. It will be understood, in addition, that a portion of the metallic algicidal materials, particularly a very fine particle size, may be absorbed into the color coating and the asphaltic base when applied thereto. The presence of the heavy carrier processing oil enhances the adherence of the metallic algicides to the roofing granules during subsequent transport, storage and handling both prior to and after the incorporation of the thus post treated roofing granules into asphaltic roofing compositions and the installation of such roofing compositions in household and other commercial roofing applications. As previously indicated, the processing oil thereafter breaks down upon exposure to atmospheric weathering conditions. The metallic algicides nevertheless and somewhat surprisingly, are found to remain on the roofing granule surface and in the roofing granule color coating and are not eroded away mechanically by wind and rain upon continued exposure to atmospheric weathering. In thus remaining on the roofing granules, the metallic algicidal materials provide a source of algicidal ions that are toxic to algae and/or fungi infestation and biological growth. Upon exposure during periods of rain and dew under extended periods of time in roofing service, the metallic algicidal materials become ionized and slowly release metallic algicidal ions that are thereupon leached over the surface of the roof to provide the desired retarding effect on the biological growth of algae and/or fungi. The finer sized metallic algicidal meterials that are absorbed into the moisture permeable, water insoluble color coating, appear to serve to provide a reservoir source of algicidal ions further assuring the continuation and the algicidal properties of the subject roofing granules over extended periods of time. In addition, the metallic algicidal materials on that portion of the subject roofing granules that is embedded in the asphalt coating of the roofing shingle or other roofing composition are retained over such extended periods of roofing application to a greater extent than the metallic algicidal materials on that portion of the roofing granule that is not so embedded in the asphalt coating. With respect to the metallic algicidal materials embedded in the asphalt coating, such algicidal materials tend to migrate from the roofing granule-asphaltic coating interface, either with asphaltic oils or otherwise, so as to thereafter become an available source of desired algicidal ions to continue the highly desirable algicidal effect on the subject roofing granules over the reasonable life of the roofing composition. As a further enhancement over the overall algicidal effect achieved in the practice of the present invention, periods of heavy rain, as previously noted, tend not only to produce a desired "wash-out" effect of algicidal ions from relatively water soluble algicidal materials over the roofing surface, but also to result in the simultaneous leaching of algicidal ions from such a source material into the interstices of the moisture permeable color coating itself. As a result, the slow leaching of algicidal ions for continued algae and/or fungi retardation over extended periods of exposure to all atmospheric weathering conditions was encountered in use.

The highly advantageous benefits achieved in the practice of the present invention are determined and illustrated in laboratory experiments and field evaluations of sample asphaltic roofing panels containing algicidal roofing granules prepared in accordance with the novel post treatment of color coated roofing granules herein provided. Such field evaluations are carried out in the United States and elsewhere under conditions highly conducive to rapid algae development. Periodic evaluation of such panels is made to observe usual comparative effects that can be reasonably related to the known performances of conventional roofing granules in ordinary roofing usage under generally applicable weathering conditions. Meaningful results are observable within periods of time ranging from about 6 months to 2 years for some test locations and up to about 3–4 years for other such locations. For comparative purposes, the algicidal roofing granules prepared in accordance with the present invention are compared with one another at varying metallic algicidal contents and with control granules exposed for the same period of time under the same set of atmospheric conditions. In these experimental runs, ordinary base mineral granules are coated with color coating paint slurries that are maintained uniform in composition throughout. The coatings thus contain conventional amounts of sodium silicate, clay and water, together with $TiO_2$ pigment to produce a white roofing granule. Such a suitable coating composition, for example, contains sodium silicate, clay, water and $TiO_2$ in respective proportions constituting 50, 40, 55 and 20 lbs. per ton of base mineral granules with which the paint slurry is mixed. A granule firing temperature of about 950°F is employed to convert the paint slurry composition to a hard, durable, tight, weather resistant, fully water insolubilized but moisture permeable granule color coating. The post treatment of the fired granules with processing oil is carried out in a conventional manner, but with a suitable heavy oil, e.g., having a viscosity of 744.8 SUS at 100° F and having a Clay/Gel analysis in percent by weight of 45.9 percent saturants, 48.4 aromatics and 5.7 percent polar compounds. The heavy oil is heated to a temperature of about 225°F to assure adequate spread or coverage of the processing oil on the surface of the granules being post treated. In the preparation of representative algicidal roofing granules of the present invention, a metallic algicide, or combination of algicides, is blended with the processing oil and mixed with the color coated roofing granules to produce color coated granules having a thin film of processing oil on the surface thereof, with a portion of the processing oil absorbed into the color coating itself, with metallic algicides adhering to the surface of the granule coating. In such algicidal roofing granule preparation, the metallic algicides employed have a particle size, or more accurately a particle size range, not exceeding about 100 mesh. The commercially available metallic algicides generally advantageous for use in the present invention are commonly available in a particular size range essentially all of which is minus 325 mesh, e.g., about 99 percent minus 325 mesh material. Illustrative samples are prepared by the use of algicidally effective amounts of metallic algicides together with a convenient amount of said processing oil, i.e., about 0.625 gallon of processing oil per ton of granules being post treated. In the application of the algicidal roofing granules and the control granules to asphaltic roofing panels, a typical granule loading of about 35 lbs. of granules per 100 sq. ft. of roofing surface is employed.

The laboratory testing and field evaluations serve to establish the algicidal effectiveness and the overall commercially significant advantages obtained in the practice of the present invention. Upon weathering away and decomposition of the post treatment processing oil, the metallic algicidal materials employed are found to remain adhering to the surface of the granule coating, with a portion of the metallic algicides being present within the color coating itself. The adherence of the metallic algicides to the granule surface is not adversely effected, therefore, by the weathering away of the processing oil. Over extended periods of exposure to atmospheric weathering, the algicidal roofing granules of the present invention are found to be effective in inhibiting or preventing the growth of algae and/or fungi. During periods of rain and dew, therefore, the metallic algicidal materials become ionized upon exposure to atmospheric moisture, and metallic algicidal ions are thereby released and leached over the surface of the sample roofing panels. Such ionization and release of metallic algicidal ions from the novel algicidal roofing granules of the present invention, however, do not occur at such rapid rate as to deplete the available supply of algicidal ions required for effective algicidal control over the reasonable life of a roofing composition. The algicidal roofing granules of the invention, therefore, enhance the resistance of a roofing composition to algae and/or fungi discoloration to a commercially satisfactory extent over a highly desirable extended period of time.

Representative algicidal granules illustrative of the invention are thus prepared using the folowing metallic algicides and proportions in the post treatment with heavy oil employed in the practice of the present invention: $Cu_2O$, 0.5 percent by weight based on the weight of base granules: Cd, Ni and Ag metal, 0.5 percent by weight based on the weight of base granules; and ZnO, 0.85 percent by weight based on the weight of base granules. The adherence of the individual algicidal particles to the color coated granules is found to be excellent, with minimal wash-off effect, resulting in minimal loss of algicidal materials either upon handling or in use during test evaluations extending over the period of years indicated above. The heavy processing oil forming a thin film on the surface of the post treated granules is found to be light and transparent, not causing an undesired darkening of the granules although the heavy oil itself is dark and grease-like in appearance.

An enhanced toxic effect in retarding the biological growth of algae and/or fungi is achieved, in the practice of the present invention, by the incorporation of both copper and zinc algicides in the post treatment operation of the present invention. The slow release of both copper and zinc ions from the subject algicidal roofing granules produces a bimetallic toxic effect that is superior to the results obtained by use of the same copper algicide at a dosage level equal or exceeding that employed for the combination of zinc and copper algicides. It is significant to note that this enhanced toxic effect is achieved by incorporating with the copper algicide, a zinc algicide in amounts ineffective for algicidal control purposes when said zinc algicide is employed alone, particularly when incorporated in the granule color coating. The combination of zinc and copper algicides is effective when such algicides are each employed in amounts within the range of from about 0.05 to about 0.5 percent by weight based on the weight of base mineral granules, each said algicide being found to be particularly effective when employed in amounts of at least about 0.1 up to about 0.4 percent. ZnO and $Cu_2O$ or a combination of $Cu_2O$ and copper sulfate are conveniently employed in the field evaluation studies as to the effectiveness of the present invention.

The present invention has been herein described principally with reference to the post treatment of conventionally color coated roofing granules with or without additional algicides present in the color coat. Hence, artificially colored roofing granules constitute the vast preponderance of roofing granules employed in commercially available asphaltic roofing compositions. It should be noted, however, that the treatment of roofing granules with processing oil and metallic algicides as herein disclosed and claimed, with reference to the post treatment of colored roofing granules, can also be employed for the treatment of natural, uncolored base mineral granules as well. As in the post treatment operation of the present invention, natural base mineral granules can be conveniently treated by mixing such natural granules with a suitable amount of processing oil together with metallic algicides having a particle size and dosage level generally the same as that indicated herein with respect to the post treatment of colored roofing granules. Upon incorporation of such algicidal, uncolored mineral granules in asphaltic roofing compositions, the adherence of the metallic algicides will be found to continue satisfactorily for extended periods of time long after the processing oil has weathered away. During periods of rain and dew, the algicidal materials on the natural granule surface will become ionized and slowly release metallic algicidal ions that, as in the case of the algicidal colored roofing granules, will be slowly leached over the surface of the roof, providing the desired toxic effect in retarding the growth of algae and/or fungi. It should also be noted that conventional silicone coating compositions can be employed together with a suitable heavy processing oil, either in the post treatment of color coated granules or in the treatment of natural granules as herein suggested, to further enhance the adherence of the metallic algicides to the surface of the granules and to further assure against undesired attrition of such particles during transport, storage and handling prior to the placement of roofing composition incorporating such algicidal granules in service as a weather resistant roofing covering. It is also within the scope of the invention to incorporate $TiO_2$ or other pigment in the heavy processing oil composition, together with the algicidal materials, for application to either color coated granules or natural granules to thus provide or enhance a desired granule coloration.

While the invention has been described herein with reference to the use of a variety of metallic algicides and combinations thereof, it will be understood that other metallic algicides presently or hereinafter available in the art can be utilized in the novel algicidal granules of the invention, produced by the novel post treatment operation herein disclosed and claimed. Various combinations of metallic algicides can also be employed within the scope of the invention. As indicated above, particularly with respect to copper algicides, the present invention permits the use of metallic organic algicides that are generally unsuited for incorporation in the granule color coating because of the the adverse effect of the granule firing temperatures used to insolubilize the color coating. It should also be noted that the post treatment operation as herein described with reference to metallic algicides can also be employed using non-metallic materials having algicidal properties, i.e., the ability to slowly release toxic ions or materials for leaching over the surface of the roof during periods of rain and dew. While the post treatment operation of the invention has herein been described with reference to the employment of algicidal materials with the heavy processing oil used in the treatment of natural granules and the post treatment of color coated granules, with or without algicides in the color coating, it should also be noted that materials other than algicides can be employed with said heavy processing oil. Particularly with reference to natural granules, for example, a heavy, processing oil compositions can be used as a carrier for a variety of treating materials such as pesticides. For example, the treated granules may have water releasable and leachable dog repellent materials, herbicides and the like adhering thereto as a result of their incorporation with the processing oil used to treat such granules as in the post treatment of color coated roofing granules. Upon mixing with the base mineral granules, the heavy processing oil will form a thin film on the granule surface, with a aportion of said oil being absorbed into the granule itself. The treating materials carried by the oil will adhere to the surface of the granule, the finer sized particles of such materials possibly being adsorbed into the granule itself. The particle size of the treating materials, if present in solid form, will be as set forth above with respect to algicidal particles. Liquid algicidal or other treating materials mixed with the heavy processing oil and with the base mineral granules being treated, either natural or color coated, will likewise form a film on the surface of the granule, with a portion thereof being absorbed into the granule. Granules thus incorporating treating materials other than algicidal materials can be employed in any convenient manner appropriate to the functional purpose of the treating material. Granules thus treated to incorporate dog repellent compositions or herbicides, for example, can be distributed on the ground over the area to be treated. Upon exposure to atmospheric weathering, the heavy processing oil will weather away and decompose, as in conventional post-treated roofing granules. The treating material will continue to adhere to the granules, however, for slow release over extended periods of time during periods of rain or dew, as in the slow release of algicidal ions from the roofing granules post-treated in accordance with the present invention.

It will also be understood that, in determining the commercial significance of algicidal roofing granules, a balance must be drawn between the desired algicidal control and the coat of the subject algicidal roofing granules, in light of pertinent, practical marketing considerations. Thus, the degree of algae control achieved, the significance of such control in terms of the ordinary life of the roofing surface, the esthetic effect of even moderate algae growth, particularly on white or light colored roofs, including the objective marketing effect of any unsightly algae and/or fungi discoloration, all in the light of the necessary incremental increase in the price of roofing compositions to achieve whatever degree of algae control is obtained, are all pertinent factors in determining the commercial significance of a novel algicidal roofing granule. The present invention is found to present a highly advantageous balance of such pertinent factors, providing a highly effective algae and/or fungi inhibiting effect at minimal incremental cost as compared with conventional, non-algicidal roofing granules.

The process of the present invention for the production of algicidal roofing granules is simple, economic, entirely compatible with the overall requirements of conventional production of color coated roofing granules, and capable of being carried out with minimum disruption of such conventional production operations. In addition, the process of the present invention has an inherent flexibility as to the nature of the algicidal material employed and the resulting characteristics of the algicidal control effect that is highly desirable in the art. As the amount of algicidal material employed to achieve effective retardation of the biological growth of algae and/or fungi in the algicidal roofing granules of the present invention is relatively low, the highly favorable processing advantages in the production of such roofing granules is not offset by an undue incremental cost for the algicidal materials employed in the roofing granules of the present invention. The incremental cost for $TiO_2$ or other conventional pigment content of the color coating to offset any undesired color effect resulting from the use of algicidal materials is also relatively small and economically acceptable. From an overall economic viewpoint, therefore, the present invention permits the availability in the art of algicidal roofing granules at a minimal incremental cost unobtainable by any previously considered techniques for imparting algicidal properties to roofing granules.

The highly advantageous production and overall economic advantages obtainable in the practice of the present invention are accompanied by a highly effective performance by the subject algicidal roofing granules in providing a supply of metallic algicidal ions for leaching over the surface of roofing compositions containing such granules to retard or prevent the infestation and growth of algae and/or fungi. Thus, the roofing composition is provided with an enhanced resistance to unsightly discoloration during such extended periods of exposure to atmospheric weathering, particularly in humid environments conducive to the growth of algae and fungi. The present invention, therefore, is of major significance to the roofing industry, providing a highly effective, but practical and economically favorable solution to the problem of algae and/or fungi discoloration of roofing surfaces. The algicidal roofing granules of the present invention and roofing compositions containing such granules represent, in effect, a high quality, premium product at minimal economic cost and optimum suitability for ready incorporation in standard commercial operations in the roofing industry.

Therefore, I claim:

1. Algicidal roofing granules capable of inhibiting or preventing the growth of discoloring algae and fungi organisms upon exposure of roofing surfaces containing such granules to atmospheric weathering for extended periods of time, comprising:
   a. base mineral granules;
   b. a moisture permeable, durable, water insolubilized, pigmented, fired, inorganic alkali metal silicate-clay coating on said base granules;
   c. a heavy processing oil composition present in an amount within the range of from about ¼ to about 1¼ gallons per ton of base granules, said processing oil forming a thin film on the surface of said coated granules, said processing oil having a viscosity within the range of from about 525 to about 950 SUS, measured at 100°F; and d. metallic algicides in the oil film and adhering to the surface of said granule coating, said algicides having a particle size not exceeding about 100 mesh and being present in amounts within the range of from about 0.05 to about 1.0 percent by weight based on the weight of the base mineral granules, metallic algicidal ions being leachable from said algicides upon exposure thereof to moisture during atmospheric weathering, whereby the weathering away of said processing oil upon atmospheric exposure of roofing surfaces incorporating said granules does not adversely affect the enhanced adherence of said metallic algicides to said granule coating, the presence of moisture during periods of rain and dew causing ionization of said metallic algicides with the resulting metallic ions being slowly leached from said granules to retard the growth of algae and fungi, thus enhancing the resistance of said roofing surfaces containing such granules to discoloration during extended periods of exposure to atmospheric weathering.

2. The algicidal roofing granules of claim 1 in which said algicides have a particle size of less than about 200 mesh.

3. The algicidal roofing granules of claim 2 in which said algicides have a particle size the major proportion of which is less than 325 mesh.

4. The algicidal roofing granules of claim 3 in which a portion of said processing oil is absorbed into the coating on said base granules, said heavy processing oil composition containing a silicone composition in an amount within the range of from about 1 to about 25 percent by weight based on the total weight of said processing oil composition.

5. The algicidal roofing granules of claim 4 in which a portion of said processing oil is absorbed into said base granules.

6. The algicidal roofing granules of claim 4 in which said algicides have a particle size at least about 99 percent of which is minus 325 mesh.

7. The algicidal roofing granules of claim 6 in which said metallic algicides have a particle size generally within the range of from about 44 to about 20 microns.

8. The algicidal roofing granules of claim 4 in which said processing oil is present in an amount within the range of from about ½ to about ¾ gallon per ton of base granules.

9. The algicidal roofing granules of claim 8 in which said processing oil is present in an amount within the range of from about 0.6 to about 0.7 gallon per ton of base granules.

10. The algicidal roofing granules of claim 3 in which said processing oil has a viscosity of from about 600 to about 800 SUS.

11. The algicidal roofing granules of claim 10 in which said processing oil has a viscosity of from about 700 to about 750 SUS.

12. The algicidal roofing granules of claim 3 in which said metallic algicide comprises a cadmium algicide.

13. The algicidal roofing granules of claim 3 in which said metallic algicide comprises a nickel algicide.

14. The algicidal roofing granules of claim 3 in which said metallic algicide comprises a silver algicide.

15. The algicidal roofing granules of claim 3 in which said metallic algicide comprises a copper algicide.

16. The algicidal roofing granules of claim 3 in which said algicide comprises a zinc algicide.

17. The algicidal roofing granules of claim 3 in which said metallic algicide comprises a mixture of copper and zinc algicides.

18. The algicidal roofing granules of claim 15 in which said copper algicide comprises $Cu_2O$.

19. The algicidal roofing granules of claim 15 in which said copper algicide comprises copper sulfate.

20. The algicidal roofing granules of claim 16 in which said zinc algicide comprises ZnO.

21. The algicidal roofing granules of claim 17 in which said zinc algicide comprises ZnO and said copper algicide comprises $Cu_2O$.

22. The algicidal roofing granules of claim 17 in which said zinc algicide comprises ZnO and said copper algicide comprises a mixture of $Cu_2O$ and copper sulfate.

23. The algicidal roofing granules of claim 15 in which said copper algicide is present in an amount within the range of from about 0.1 to about 1.0 percent by weight based on the total weight of said base granules.

24. The algicidal roofing granules of claim 16 in which said zinc algicide is present in an amount of at least about 0.75 percent by weight based on the weight of said base granules.

25. The algicidal roofing granules of claim 17 in which said copper and zinc algicides are both present in an amount within the range of from about 0.05 to about 0.5 percent by weight based on the total weight of said base granules.

26. The algicidal roofing granules of claim 18 in which said $Cu_2O$ is present in an amount within the range of from about 0.1 to about 1.0 percent weight based on the total weight of said base granules.

27. The algicidal roofing granules of claim 20 in which said ZnO is present in an amount of at least about 0.75 percent by weight based on the weight of said base granules.

28. The algicidal roofing granules of claim 6 in which a portion of said metallic algicides is adsorbed into the silicate-clay coating on said base mineral granules.

29. The algicidal roofing granules of claim 25 in which a portion of said metallic algicides is present in said silicate-clay coating on said base granules.

30. The algicidal roofing granules of claim 29 in which said metallic algicides have a particle size at least about 99 percent of which is minus 325 mesh.

* * * * *